(12) United States Patent
Evrikoz

(10) Patent No.: US 6,810,647 B1
(45) Date of Patent: Nov. 2, 2004

(54) LIGHTWEIGHT LAWN TRIMMER, MOWER AND EDGER SYSTEM

(76) Inventor: Takvor Evrikoz, 1307 Gulf Way, St. Pete Beach, FL (US) 33706

( * ) Notice: Subject to any disclaimer, the term of this patent is extended or adjusted under 35 U.S.C. 154(b) by 0 days.

(21) Appl. No.: 10/395,753

(22) Filed: Mar. 24, 2003

(51) Int. Cl.⁷ .............................................. A01D 34/00
(52) U.S. Cl. ........................................................ 56/12.7
(58) Field of Search .............................. 56/12.7, 17.2, 56/16.7, 16.9, 17.5; 172/15, 17

(56) References Cited

U.S. PATENT DOCUMENTS

| | | | | |
|---|---|---|---|---|
| 2,672,002 A | * | 3/1954 | Nelson | 56/16.9 |
| 3,625,292 A | * | 12/1971 | Lay | 172/13 |
| 4,224,784 A | * | 9/1980 | Hansen et al. | 56/16.9 |
| 4,343,139 A | * | 8/1982 | Lowry et al. | 56/16.9 |
| 4,442,659 A | * | 4/1984 | Enbusk | 56/12.7 |
| 4,679,385 A | * | 7/1987 | Carmine | 56/16.9 |
| 4,712,363 A | * | 12/1987 | Claborn | 56/16.7 |
| 4,914,899 A | * | 4/1990 | Carmine | 56/16.7 |
| 4,922,694 A | * | 5/1990 | Emoto | 56/16.7 |
| 4,981,012 A | * | 1/1991 | Claborn | 56/16.9 |
| 5,408,816 A | * | 4/1995 | Cartier | 56/17.5 |
| 5,613,354 A | * | 3/1997 | Foster | 56/16.7 |
| 6,116,350 A | * | 9/2000 | Notaras et al. | 172/15 |

* cited by examiner

Primary Examiner—Aárpád Fábián Kovács
(74) Attorney, Agent, or Firm—Edward P. Dutkiewicz

(57) ABSTRACT

A support bar has an upper end and a lower end. A motor housing is coupled to the lower end of the support bar. The motor has a rotatable drive shaft and a pair of wires. The wires extend from the drive shaft. The wires are rotatable in a primary plane parallel with a plane of the grass to be mowed. The wires alternately are rotatable in a secondary plane. A deck is coupled to the housing and the deck. A flap and a pair of hinges couple the housing to an adjacent portion of the deck. A pair of riding wheels is coupled to the deck and adapted to ride on a top surface of grass when edging soil. A pair of guard wheels is coupled to the deck and adapted to ride on a side face of soil when edging soil.

5 Claims, 4 Drawing Sheets

LIGHTWEIGHT LAWN TRIMMER, MOWER AND EDGER SYSTEM

BACKGROUND OF THE INVENTION

1. Field of the Invention

The present invention relates to a lightweight lawn trimmer, mower and edger system and more particularly pertains to facilitating the safe and convenient cutting of grass, trimming, and edging of soil.

2. Description of the Prior Art

The use of cutting and edging systems of known designs and configurations is known in the prior art. More specifically, cutting and edging systems of known designs and configurations previously devised and utilized for the purpose of cutting and edging through known methods and apparatuses are known to consist basically of familiar, expected, and obvious structural configurations, notwithstanding the myriad of designs encompassed by the crowded prior art which has been developed for the fulfillment of countless objectives and requirements.

| Patent No. | Issue Date | Inventor | Title |
|---|---|---|---|
| 4,466,235 | Aug. 21, 1984 | Cole | Rotary Mower |
| 4,551,967 | Nov. 12, 1985 | Murcko | Combination Lawnmower and Edger |
| 4,718,221 | Jan. 12, 1988 | Wessel et al. | Lawnmower Edger and Trimmner |

While these devices fulfill their respective, particular objectives and requirements, the aforementioned patents do not describe a lightweight trimmer, lawn mower and edger system that allows facilitating the safe and convenient cutting of grass, trimming, and edging of soil.

In this respect, the lightweight trimmer, lawn mower and edger system according to the present invention substantially departs from the conventional concepts and designs of the prior art, and in doing so provides an apparatus primarily developed for the purpose of facilitating the safe and convenient cutting of grass, trimming, and edging of soil.

Therefore, it can be appreciated that there exists a continuing need for a new and improved lightweight lawn mower, trimmer, and edger system which can be used for facilitating the safe and convenient cutting of grass, trimming, and edging of soil. In this regard, the present invention substantially fulfills this need.

SUMMARY OF THE INVENTION

In view of the foregoing disadvantages inherent in the known types of cutting, trimming, and edging systems of known designs and configurations now present in the prior art, the present invention provides an improved lightweight lawn mower, trimmer, and edger system. As such, the general purpose of the present invention, which will be described subsequently in greater detail, is to provide a new and improved lightweight lawn mower, trimmer, and edger system and method which has all the advantages of the prior art and none of the disadvantages.

To attain this, the present invention essentially comprises an aluminum cylindrical support bar. The support bar has an upper end and a lower end.

A molded plastic power grip is provided. The grip is coupled to the upper end of the support bar. The grip is formed in a cylindrical configuration. The grip has a bend and a gripping portion. The grip has a variable power controlling trigger and an associated trigger guard. The trigger further has a power source input in the form of an electrical receptacle.

A molded plastic support handle is provided next. The support handle is coupled to an intermediate portion of the support bar adjacent to the lower end of the grip. The support handle has an angle adjusting nut. The support handle is adapted to allow the user to comfortably hold the system in a safe and secure manner.

Provided next is a molded plastic motor housing. The motor housing is formed in a cylindrical configuration. The motor housing has a bent bulbous end. The motor housing has a linear end. The linear end is coupled to the lower end of the support bar.

A motor is provided. The motor is housed in the bulbous end of the motor housing. The motor has a rotatable drive shaft. The motor has a pair of braided stainless steel wires. The wires extend oppositely from each other from the drive shaft. The wires are rotatable in a primary plane parallel with a plane of the grass to be mowed or trimmed. The wires alternately are rotatable in a secondary plane perpendicular to the primary plane and parallel with a plane of the soil to be edged.

Also provided is a molded plastic disc-shaped protective deck. The deck has a top face and a bottom face. The deck further has a front, a back and a pair of sides. The top face is coupled to the bulbous end of the motor housing. The deck has a central cylindrical aperture. The drive shaft extends through the aperture. A lip is provided around the periphery of the deck. The lip extends downwardly. A flap is provided. The flap is comprised of an arc of the front of the deck. The flap has a pivot end, an arced end and a pair of side edges. The flap further has a pair of hinges. The hinges couple the pivot end of the housing to an adjacent portion of the deck. A latch is provided. The latch is coupled to the deck. The latch is adapted to hold the flap down when operating to cut grass. The flap is adapted to pivot upwardly 90 degrees. In this manner the wires are exposed when operating to trim grass or edge soil.

A pair of riding wheels is provided. The riding wheels are coupled to the bottom face of the deck adjacent to the pivot end of the flap. The riding wheels are adapted to ride on a top surface of grass when edging soil.

A pair of guard wheels is provided. The guard wheels are coupled to the lip of the deck adjacent to the flap. The guard wheels are adapted to ride on a side face of soil when edging soil.

The system thus has three sets of wheels, caster wheels which are rotatable about a primary axes A when cutting grass or trimming and wherein the primary axes are in a plane parallel with grass to be cut or trimmed, and riding wheels rotatable about parallel secondary axes B which are perpendicular to the primary axes A, and guard wheels rotatable about parallel tertiary axes C which are perpendicular to the secondary axes.

A pair of slots are provided. The slots are provided on the sides of the deck. A locking edge is associated with each slot.

A pair of stabilizing beams is provided. Each stabilizing beam has an upper end and a lower end. The upper ends are coupled to the motor housing adjacent to the lower end of the support bar. The lower ends are coupled to the sides of the deck.

Further provided is a pair of caster wheels. Each castor wheel has an associated L-shaped flange. A horizontal portion is coupled to a castor wheel. A vertical portion has retention bumps. The bumps are adapted to removably couple within the slots on the side end of the protective housing. The wheels are employed when the flap is down and grass is being cut or trimmed. The wheels may be removed when the flap is up and soil is being edged.

Provided last, for optional use, is a bag for collecting cut grass clippings. The bag has a lower end. The lower end is coupled to the rear end of the deck at an aperture. The bag has an upper end. The upper end is coupled to the support handle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lightweight lawn mower, trimmer, and edger system which has all of the advantages of the prior art cutting, trimming, and edging systems of known designs and configurations and none of the disadvantages.

It is another object of the present invent on to provide a new and improved lightweight, weighing less than 10 pounds, lawn mower and edger system which may be easily and efficiently manufactured and marketed.

It is further an object of the present invention to provide a new and improved lightweight lawn mower, trimmer, and edger system which is of durable and reliable constructions.

An even further object of the present invention is to provide a new and improved lightweight lawn mower, trimmer, and edger system which is susceptible of a low cost of manufacture with regard to both materials and labor, and which accordingly is then susceptible of low prices of sale to the consuming public, thereby making such lightweight lawn mower, trimmer, and edger system economically available to the buying public.

Even still another object of the present invention is to provide a lightweight lawn mower, trimmer, and edger system for facilitating the safe and convenient cutting of grass and edging of soil.

Lastly, it is an object of the present invention to provide a new and improved lightweight lawn mower, trimmer, and edger system. A support bar has an upper end and a lower end. A motor housing is coupled to the lower end of the support bar. The motor has a rotatable drive shaft and a pair of wires. The wires extend from the drive shaft. The wires are rotatable in a primary plane parallel with a plane of the grass to be mowed or trimmed. The wires alternately are rotatable in a secondary plane. A deck is coupled to the housing and the deck. A flap and a pair of hinges couple the housing to an adjacent portion of the deck. A pair of riding wheels is coupled to the deck and adapted to ride on a top surface of grass when edging soil. A pair of guard wheels is coupled to the deck and adapted to ride on a side face of soil when edging soil.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The present invention will be better understood and objects other than those set forth above will become apparent when consideration is given to the following detailed description thereof. Such description makes reference to the annexed drawings wherein.

The same reference numerals used herein are intended to refer to the same parts throughout the various Figures of the present invention.

DESCRIPTION OF THE PREFERRED EMBODIMENT

Figure 1:
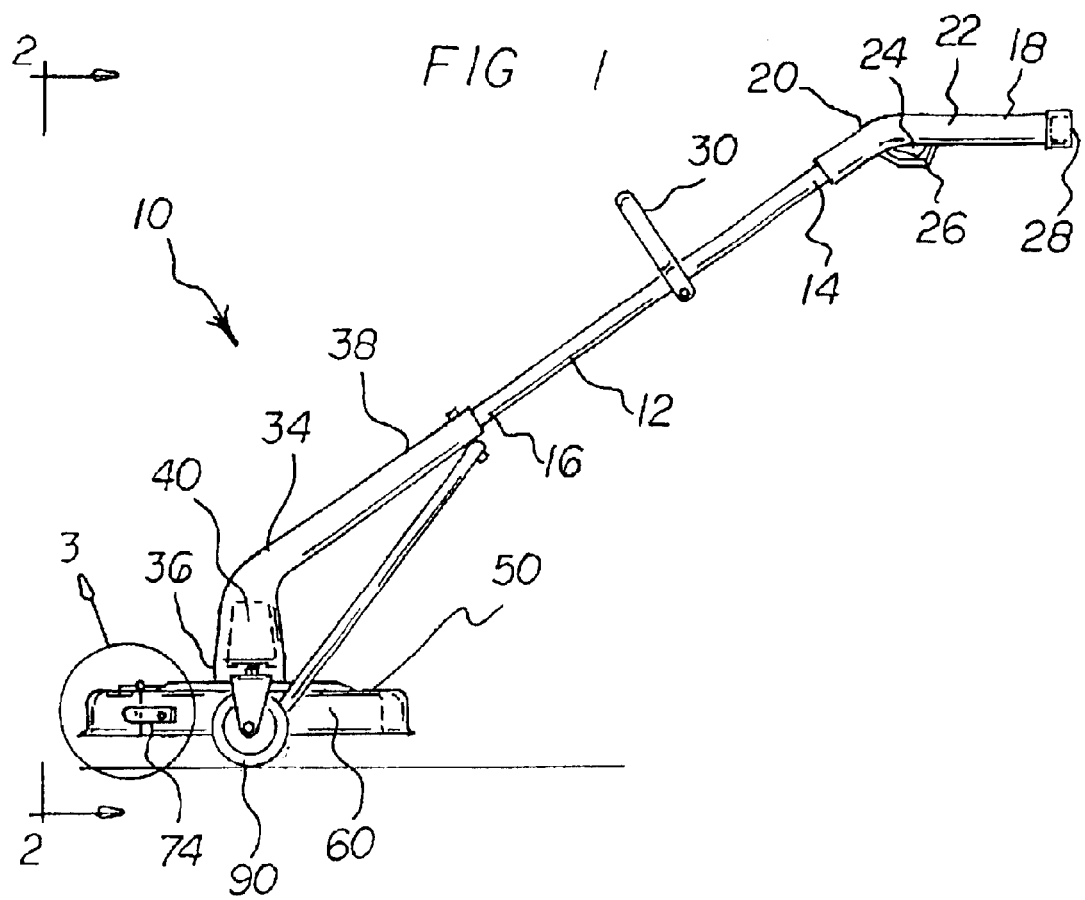
FIG. 1 is a side elevational view of a lawnmower, trimmer, and edger system, to facilitating the safe and convenient cutting of grass constructed in accordance with the principles of the present invention.
Figure 2:
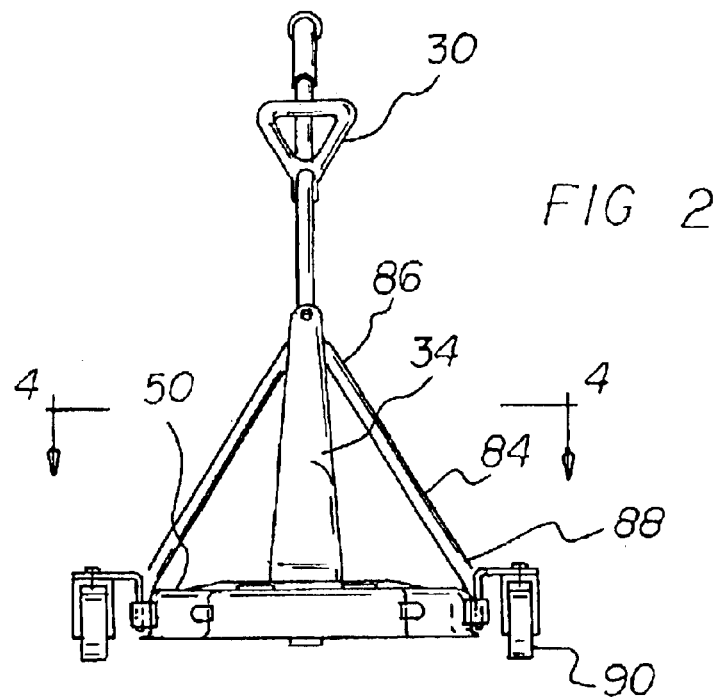
FIG. 2 is a front elevational view of the system shown in FIG. 1.
Figure 3:
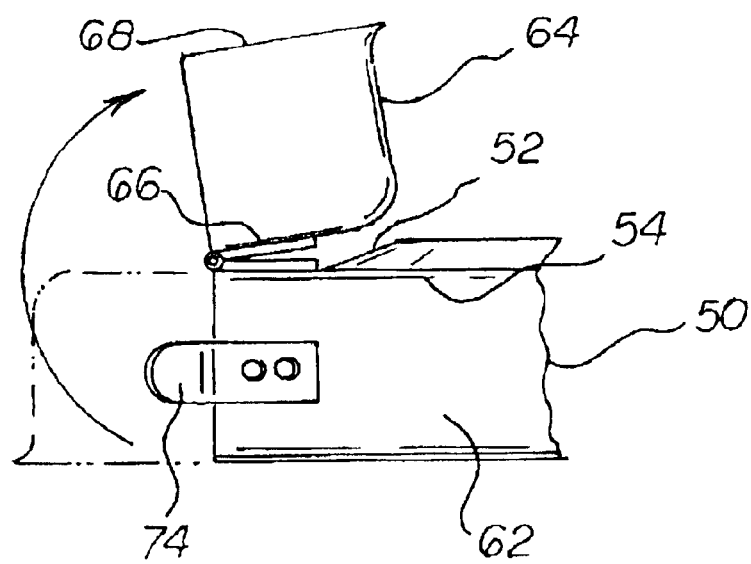
FIG. 3 is an enlarged side elevational view of the system taken at circle 3 of FIG. 1 but with the flap Lifted in anticipation of facilitating the trimming of the grass and edging of the soil.
Figure 4:
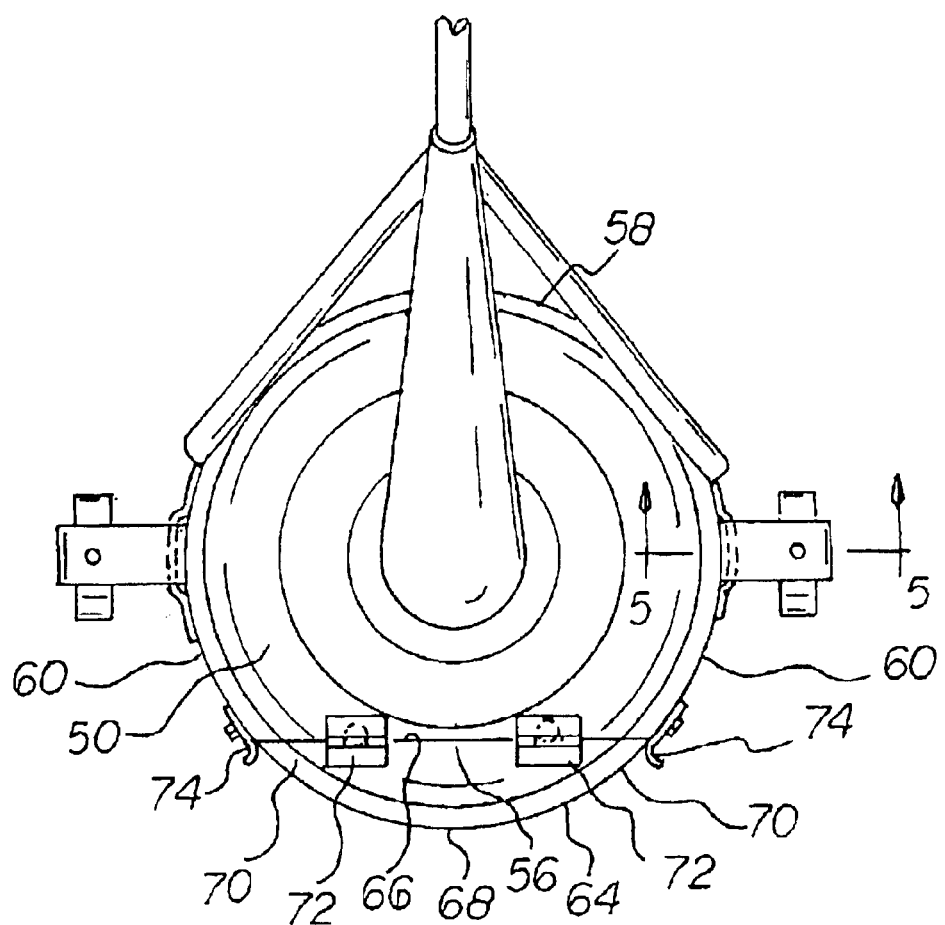
FIG. 4 is a plan view of the system taken at line 4—4 of FIG. 2.
Figure 5:
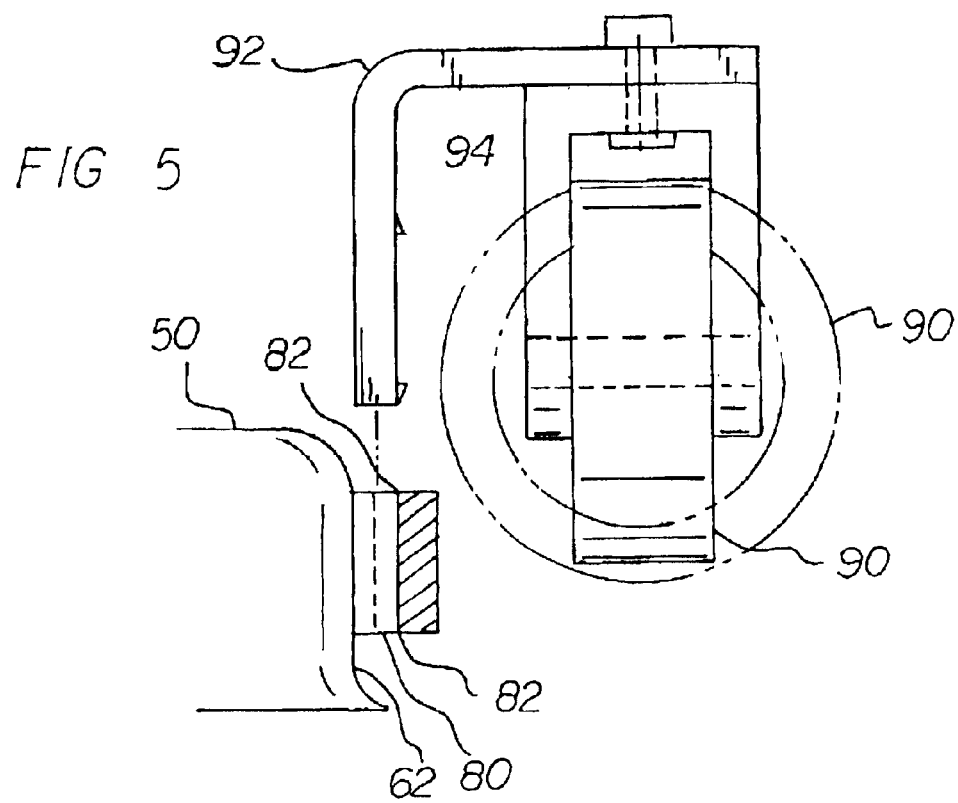
FIG. 5 is a cross sectional view of the system taken along line 5—5 of FIG. 4.
Figure 6:
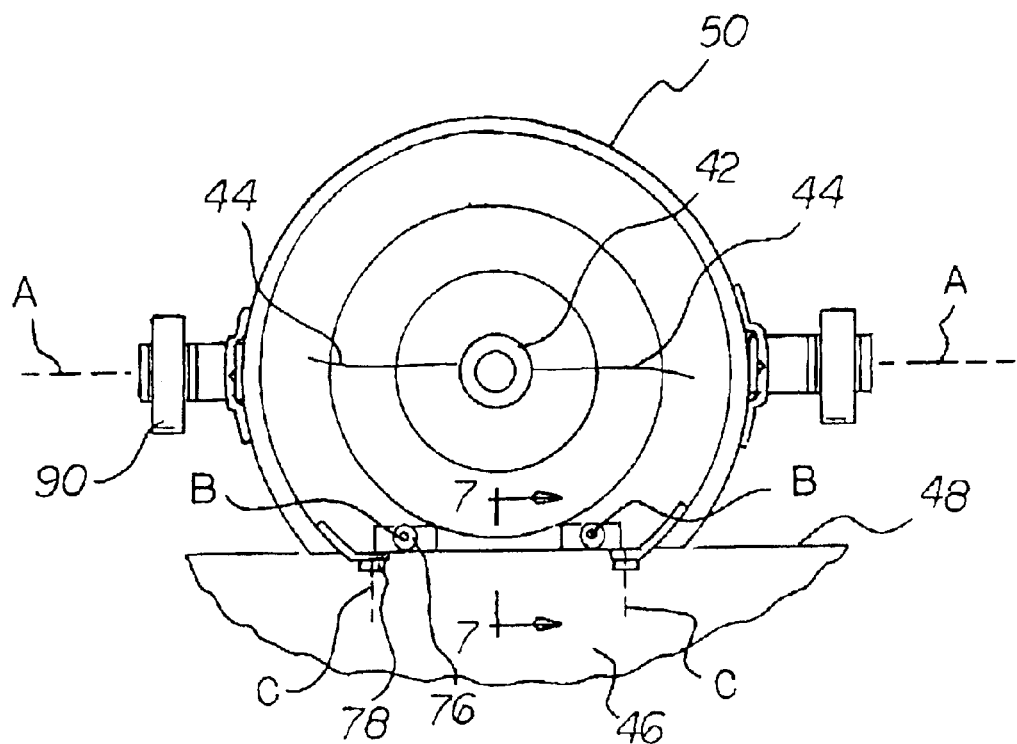
FIG. 6 is a bottom view of the system but with the flap lifted in anticipation of edging soil.
Figure 7:
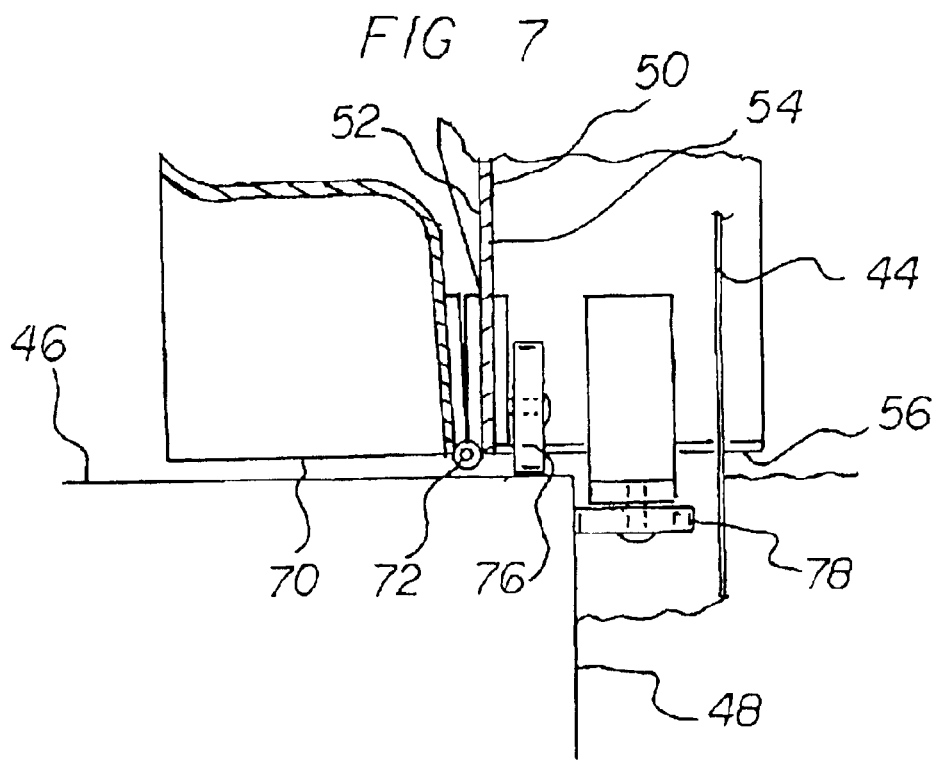
FIG. 7 is an enlarged cross sectional view taken along line 7—7 of FIG. 6.
Figure 8:
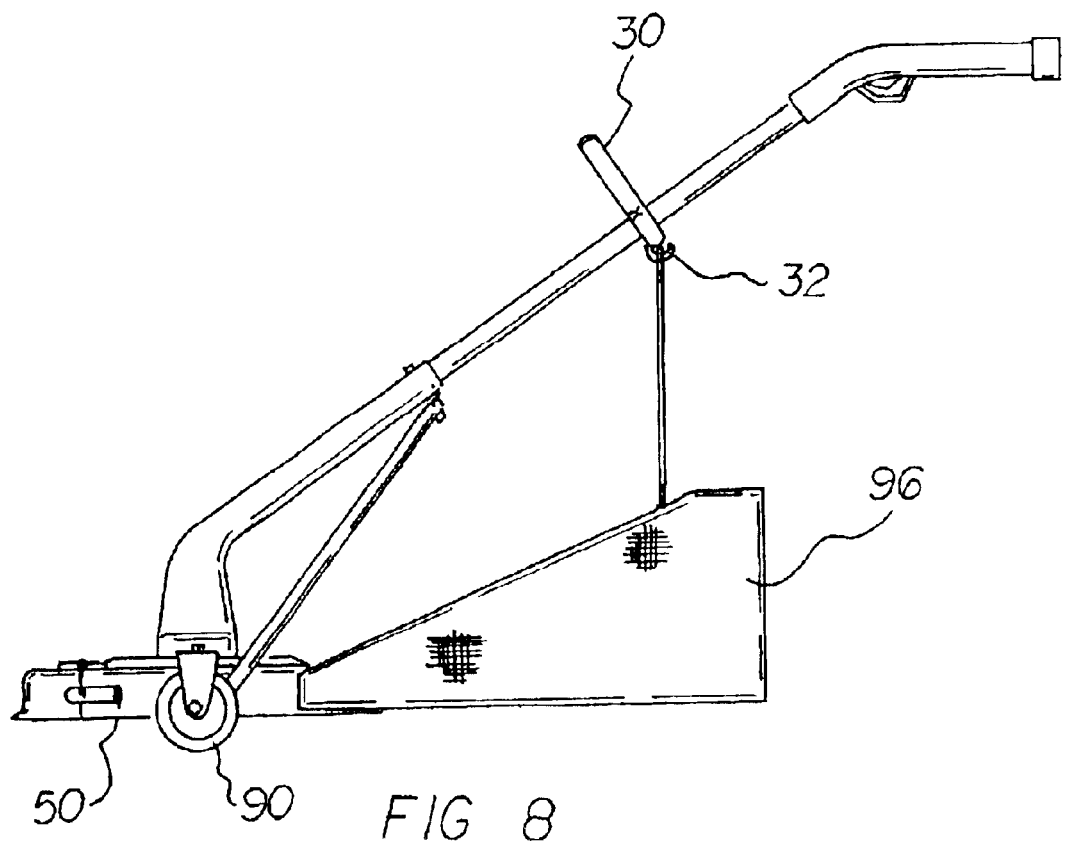
FIG. 8 is a side elevational view of the system similar to FIG. 1 but with a bag attached.

With reference now to the drawings, and in particular to FIG. 1 thereof, the preferred embodiment of the new and improved lightweight lawn mower and edger system embodying the principles and concepts of the present invention and generally designated by the reference numeral 10 will be described.

The present invention, the lightweight lawnmower and edger system 10 is comprised of a plurality of components. Such components in their broadest context include a support bar, a motor housing, a motor, a deck, d pair of riding wheels and a pair of guard wheels. Such components are individually configured and correlated with respect to each other so as to attain the desired objective.

First provided is an aluminum cylindrical support bar 12. The support bar has an upper end 14 and a lower end 16.

A molded plastic power grip 18 is provided. The grip is coupled to the upper end of the support bar. The grip is formed in a cylindrical configuration. The grip has a bend 20 and a gripping portion 22. The grip has a variable power controlling trigger 24 and an associated trigger guard 26. The trigger further has a power source input in the form of an electrical receptacle 28.

A molded plastic support handle 30 is provided next. The support handle is coupled to an intermediate portion of the support bar adjacent to the lower end of the grip. The support handle has an angle adjusting nut 32. The support handle is adapted to allow the user to comfortably hold the system in a safe and secure manner.

Provided next is a molded plastic motor housing 34. The motor housing is formed in a cylindrical configuration. The motor housing has a bent bulbous end 36. The motor housing has a linear end 38. The linear end is coupled to the lower end of the support bar.

A motor 40 is provided. The motor is housed in the bulbous end of the motor housing. The motor has a rotatable drive shaft 42. The motor has a pair of braided stainless steel wires 44. The wires extend oppositely from each other from the drive shaft. The wires are rotatable in a primary plane parallel with a plane of the grass 46 to be mowed or trimmed. The wires alternately are rotatable in a secondary plane perpendicular to the primary plane and parallel with a plane of the soil 48 to be edged.

Also provided is a molded plastic disc-shaped protective deck 50. The deck has a top face 52 and a bottom face 54. The deck further has a front 56, a back 58 and a pair of sides 60. The top face is coupled to the bulbous end of the motor housing. The deck has a central cylindrical aperture. The drive shaft extends through the aperture. A lip 62 is provided around the periphery of the deck. The lip extends downwardly. A flap 64 is provided. The flap is comprised of an arc of the front of the deck. The flap has a pivot end 66, an arced end 68 and a pair of side edges 70. The flap further has a pair of hinges 72. The hinges couple the pivot end of the housing to an adjacent portion of the deck. A latch 74 is provided. The latch is coupled to the deck. The latch is adapted to hold the flap down when operating to cut grass. The flap is adapted to pivot upwardly 90 degrees. In this manner the wires are exposed when operating to trim grass or to edge soil.

A pair of riding wheels 76 is provided. The riding wheels are coupled to the bottom face of the deck adjacent to the pivot end of the flap. The riding wheels are adapted to ride on a top surface of grass when edging soil.

A pair of guard wheels 78 is provided. The guard wheels are coupled to the lip of the deck adjacent to the flap. The guard wheels are adapted to ride on a side face of soil when edging soil.

A pair of slots 30 are provided. The slots are provided on the sides of the deck. A locking edge 82 is associated with each slot.

A pair of stabilizing beams 84 is provided. Each stabilizing beam has an upper end 86 and a lower end 88. The upper ends are coupled to the motor housing adjacent to the lower end of the support bar. The lower ends are coupled to the sides of the deck.

Further provided is a pair of caster wheels 90, Each castor wheel has an associated L-shaped flange 92. A horizontal portion is coupled to a caster wheel. A vertical portion has retention bumps 94. The bumps are adapted to removably couple within the slots on the side end of the protective housing. The wheels are employed when the flap is down and grass is being cut or trimmed. The wheels may be removed when the flap is up and soil is being edged.

The system thus has three sets of wheels, caster wheels 90 which are rotatable about a primary axes A when cutting grass and wherein the primary axes are in a plane parallel with grass 46 to be cut, and riding wheels 76 rotatable about parallel secondary axes B which are perpendicular to the primary axes A, and guard wheels 76 rotatable about parallel tertiary axes C which are perpendicular to the secondary axes.

Provided last is a bag 96 for collecting cut grass clippings. The bag's use is optional. The bag has a lower end. The lower end is coupled to the rear end of the deck at an aperture. The bag has an upper end. The upper end is coupled to the support handle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lightweight lawn trimmer, mower, and edger system for facilitating the safe and convenient cutting of grass, trimming, and edging of soil comprising, in combination;

an aluminum cylindrical support bar having an upper end and a lower end;

a molded plastic power grip coupled to the upper end of the support bar formed in a cylindrical configuration with a bend and a gripping portion and with a variable power controlling trigger and an associated trigger guard, the trigger further having a power source input in the form of an electrical receptacle;

a molded plastic support handle coupled to an intermediate portion of the support bar adjacent to the lower and of the grip and having an angle adjusting nut, the support handle being adapted to allow the user to comfortably hold the system in a safe and secure manner;

a molded plastic motor housing formed in a cylindrical configuration and having a bent bulbous end and a linear end coupled to the lower end of the support bar;

a motor housed in the bulbous end of the motor housing with the motor having a rotatable drive shaft and a pair of braided stainless steel wires extending oppositely from each other from the drive shaft, the wires being rotatable in a primary plane parallel with a plane of grass to be mowed, the wires alternately being rotatable in a secondary plane;

a molded plastic disc-shaped protective deck having a top face, a bottom face, a front, a back and a pair of sides with the top face being coupled to the bulbous end of the motor housing and the deck having a central cylindrical aperture through which the drive shaft extends, a lip around the periphery of the deck extending downwardly, a flap being comprised of an arc of the front of the deck, the flap having a pivot end, an arced end and a pair of side edges, a pair of hinges coupling the pivot end of the housing to an adjacent portion of the deck, a latch coupled to the deck and adapted to hold the flap down when operating to cut grass, the flap adapted to pivot upwardly 90 degrees to expose the wires when operating to edge soil;

a pair of riding wheels coupled to the bottom face of the deck adjacent to the pivot end of the flap and adapted to ride on a top surface of grass when edging soil;

a pair of guard wheels coupled to the lip of the deck adjacent to the flap and adapted to ride on a aide face of soil when edging soil;

a pair of slots on the sides of the deck with a locking edge associated with each slot;

a pair of stabilizing beams, each stabilizing beam having an upper end and a lower end with the upper ends being coupled to the motor housing adjacent to the lower end of the support bar and the lower ends being coupled to the sides of the deck;

a pair of caster wheels, each castor wheel having an associated L-shaped flange with a horizontal portion being coupled to a castor wheel and a vertical portion with retention bumps being adapted to removably couple within the slots on the side end of the protective housing, the wheels being employed when the flap is down and grass is being cut and the wheels being removed when the flap is up and soil is being edged, the system thus having three sets of wheels, castor wheels which are rotatable about a primary axes A when cutting grass and wherein the primary axes are in a plane parallel with grass to be cut, and riding wheels rotatable about parallel secondary axes B which are perpendicular to the primary axes A, and guard wheels rotatable about parallel tertiary axes C which are perpendicular to the secondary axes; and a bag for collecting cut grass clippings, the bag having a lower end coupled to the rear end of the deck at an aperture and the bag having an upper end coupled to the support handle.

2. A lawn mower and edger system comprising;

a support bar having an upper end and a lower end;

a motor housing coupled to the lower end of the support bar;

a motor housed in the housing with the motor having a rotatable drive shaft and a pair of wires extending from the drive shaft, the wires being rotatable in a primary plane parallel with a plane of the grass to be mowed, the wires alternately being rotatable in a secondary plane;

a deck coupled to the housing and the deck with a flap and a pair of hinges coupling the housing to an adjacent portion of the deck;

a pair of riding wheels coupled to the bottom face of the deck adjacent to the pivot end of the flap and adapted to ride on a top surface of grass when edging soil; and a pair of guard wheels coupled to the lip of the deck adjacent to the flap and adapted to ride on a side face of soil when edging soil, wherein the riding wheels are rotatable about secondary axes in a secondary plane parallel with the to surface of the grass when edging soil and wherein the guard wheels are rotatable about tertiary axes in tertiary plane which is perpendicular with the secondary plane and perpendicular to the top surface of the grass when edging soil.

3. The system as set forth in claim 2 wherein the system has three sets of wheels, caster wheels which are rotatable about a primary axes A when cutting grass and wherein the primary axes are in a plane parallel with grass to be cut, and riding wheels rotatable about parallel secondary axes B which are perpendicular to the primary axes A, and guard wheels rotatable about parallel tertiary axes C which are perpendicular to the secondary axes.

4. The system as set forth in claim 2 and further including a molded plastic support handle coupled to an intermediate portion of the support bar and having an angle adjusting nut, the support handle being adapted to allow the user to comfortably hold the system in a safe and secure manner.

5. The system as set forth in claim 4 and further including bag for collecting cut grass clippings, the bag having a lower end coupled to the rear end of the deck at an aperture and the bag having an upper end coupled to the support handle.

* * * * *